United States Patent
Poteet et al.

(10) Patent No.: US 8,423,435 B1
(45) Date of Patent: Apr. 16, 2013

(54) PAYROLL WITHHOLDING FOR DEBT MANAGEMENT

(75) Inventors: Jason Poteet, Lodi, CA (US); Timothy Steuart Teichman, Sunnyvale, CA (US); Shannon Keswick, Fremont, CA (US)

(73) Assignee: Intuit Inc., Mountain View, CA (US)

( * ) Notice: Subject to any disclaimer, the term of this patent is extended or adjusted under 35 U.S.C. 154(b) by 196 days.

(21) Appl. No.: 12/714,175

(22) Filed: Feb. 26, 2010

(51) Int. Cl.
*G06F 15/02* (2006.01)
*G07C 1/10* (2006.01)

(52) U.S. Cl.
USPC ............................................. 705/32

(58) Field of Classification Search .............. 705/32, 705/1.1
See application file for complete search history.

(56) References Cited

U.S. PATENT DOCUMENTS

| | | | |
|---|---|---|---|
| 6,347,306 B1 * | 2/2002 | Swart | 705/32 |
| 6,829,588 B1 * | 12/2004 | Stoutenburg et al. | 705/30 |
| 7,072,909 B2 * | 7/2006 | Polk | 1/1 |
| 7,249,073 B1 * | 7/2007 | Lesk | 705/32 |
| 7,305,347 B1 * | 12/2007 | Joao | 705/4 |
| 7,398,238 B1 * | 7/2008 | Calce et al. | 705/35 |
| 7,912,768 B2 * | 3/2011 | Abeles et al. | 705/31 |
| 2003/0074311 A1 * | 4/2003 | Saylors et al. | 705/39 |
| 2003/0105688 A1 * | 6/2003 | Brown et al. | 705/31 |
| 2003/0187694 A1 * | 10/2003 | Rowen | 705/2 |
| 2004/0019545 A9 * | 1/2004 | Polk | 705/35 |
| 2006/0167775 A1 * | 7/2006 | Cudzilo et al. | 705/35 |
| 2007/0136156 A1 * | 6/2007 | Seeley et al. | 705/30 |
| 2009/0192926 A1 * | 7/2009 | Tarapata | 705/32 |
| 2009/0327127 A1 * | 12/2009 | Compiano | 705/40 |

* cited by examiner

*Primary Examiner* — Seye Iwarere
(74) *Attorney, Agent, or Firm* — Osha Liang LLP

(57) ABSTRACT

In general, in one aspect, the invention relates to a method for withholding an amount of payroll funds of an employee to fulfill a financial obligation of the employee. The method involves receiving employee debt information and receiving employee payroll information. The method further involves calculating, using a central processing unit (CPU), an amount of available payroll funds based on the employee payroll information. The method further involves determining, using the CPU, whether the amount of available payroll funds exceeds a debt amount, where the debt amount is based on the employee debt information. The method further involves extracting, using the CPU, the debt amount from the amount of available payroll funds to obtain a payroll balance, where the payroll balance is subsequently sent to the employee. The method further involves sending, using the CPU, the debt amount to the creditor of the employee to fulfill the financial obligation.

34 Claims, 6 Drawing Sheets

PAYROLL WITHHOLDING FOR DEBT MANAGEMENT

BACKGROUND

Successfully managing personal credit is a big issue with many consumers. Specifically, consumers often lack the discipline to spend less than they earn. When consumers spend more than they earn, they take on debt. If debt payments are missed, a consumer's credit rating may be adversely impacted. Many times, a consumer lacking disciplined spending habits spends cash on hand rather than commit the money to reduce an existing debt with a creditor. For example, a person may have an existing balance on his credit card. If that person works, he receives a paycheck periodically. Each paycheck reflects the consumer's net pay, which is his gross wages less any legacy withholdings. Examples of legacy withholdings include, but are not limited to, federal tax, health insurance premiums, 401(k), child support, and union dues. When the consumer receives his net pay, he often spends it rather than use some of the net pay toward the existing balance with his creditor.

Alternatively, while the consumer may genuinely want to reduce his debt amount and/or term of the debt to his creditor, the consumer may lack the sophistication to determine the best way to achieve this goal given his income and other financial obligations. For example, a consumer with a credit card balance may be making minimum monthly payments, which extends the terms of the debt. The consumer may benefit from the knowledge that a different credit card company would allow the consumer to transfer his entire balance and receive a lower interest rate, effectively reducing the term of the debt. As another example, the consumer may benefit from the knowledge that, by paying 110% of the minimum monthly payments, the term of the debt may be reduced by two years. In other words, the term and/or the amount of a consumer's debt are often extended because the consumer is not disciplined and/or educated enough to manage the money he has before he decides to spend it.

SUMMARY

In general, in one aspect, the invention relates to a method for withholding an amount of payroll funds of an employee to fulfill a financial obligation of the employee. The method involves receiving employee debt information and receiving employee payroll information. The method further involves calculating, using a central processing unit (CPU), an amount of available payroll funds based on the employee payroll information, where the amount of available payroll funds is an amount of gross payroll funds less an amount of a legacy withholding. The method further involves determining, using the CPU, whether the amount of available payroll funds exceeds a debt amount, where the debt amount is based on the employee debt information. The method further involves extracting, using the CPU, the debt amount from the amount of available payroll funds to obtain a payroll balance, where the payroll balance is subsequently sent to the employee. The method further involves sending, using the CPU, the debt amount to the creditor of the employee to fulfill the financial obligation.

In general, in one aspect, the invention relates to a computer readable medium embodying instructions executable by a computer to perform method steps for withholding an amount of payroll funds of an employee to fulfill a financial obligation of the employee. The instructions include functionality to receive employee debt information and receive employee payroll information. The instructions further include functionality to calculate an amount of available payroll funds based on the employee payroll information, where the amount of available payroll funds is an amount of gross payroll funds less an amount of a legacy withholding. The instructions further include functionality to determine whether the amount of available payroll funds exceeds a debt amount, where the debt amount is based on the employee debt information. The instructions further include functionality to extract the debt amount from the amount of available payroll funds to obtain a payroll balance, where the payroll balance is subsequently sent to the employee. The instructions further include functionality to send the debt amount to the creditor of the employee to fulfill the financial obligation.

In general, in one aspect, the invention relates to a system for withholding an amount of payroll funds of an employee to fulfill a financial obligation of the employee. The system includes a payroll calculator executing on a central processing unit (CPU) and configured to calculate an amount of available payroll funds based on employee payroll information, where the amount of available payroll funds is an amount of gross payroll funds less an amount of a legacy withholding. The system further includes a payment calculator executing on the CPU and configured to calculate a debt amount based on employee debt information. The system further includes a payroll funds coordinator executing on the CPU and configured to receive the employee debt information and send the employee debt information to the payment calculator. The payroll funds coordinator is further configured to receive the employee payroll information and send the employee payroll information to the payroll calculator. The payroll funds coordinator is further configured to receive the amount of available payroll funds from the payroll calculator and receive the debt amount from the payment calculator. The payroll funds coordinator is further configured to determine whether the amount of available payroll funds is greater than the debt amount and extract the debt amount from the amount of available payroll funds to obtain a payroll balance, where the payroll balance is subsequently sent to the employee. The payroll funds coordinator is further configured to send the debt amount to a creditor of the employee to fulfill the financial obligation.

DETAILED DESCRIPTION

Figure 1:
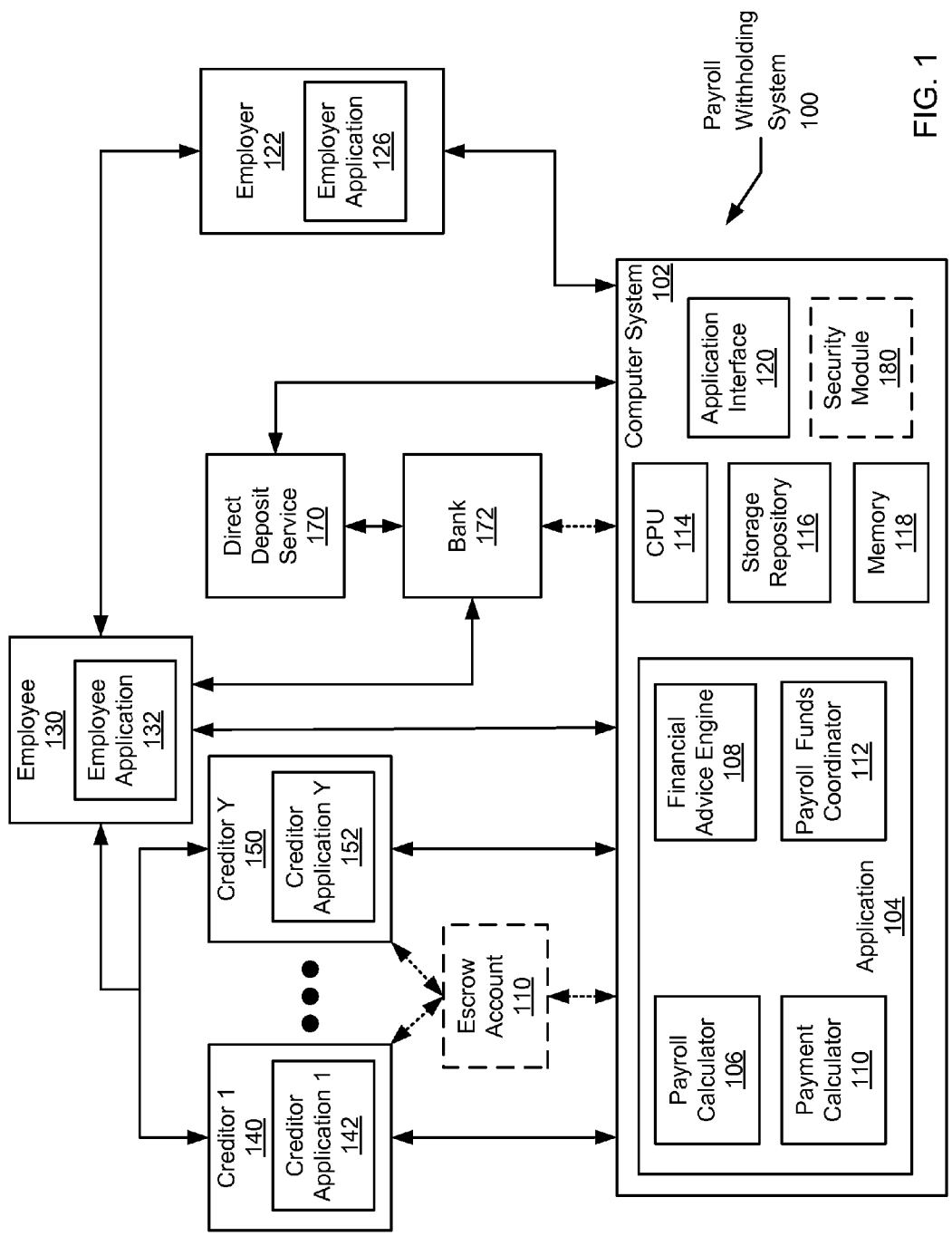
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

In general, embodiments of the invention provide for payroll withholding for debt management. More specifically, one or more embodiments of the invention provide for withholding an amount of payroll funds of an employee to fulfill a financial obligation of the employee. Specifically, the financial obligation of the employee may be a debt owed by the employee to a creditor. A legacy withholding is a payroll withholding that is currently known in the art. Examples of a legacy withholding are a federal tax, a state tax, a local tax, an insurance premium, a retirement plan, a stock purchase plan, a medical reimbursement plan, union dues, a wage garnishment, and an expense directly related to a job function, as allowed by a government entity, of the employee in a course of employment for the employer. Further, withholding information may include, but is not limited to, payroll information for an employee, withholding elections (both legacy withholdings and non-legacy withholdings), creditor information, information about a debt of an employee, actual and proposed changes to debt terms, actual and proposed changes to payroll information of the employee, and other information related to the employee's payroll and/or debts. In one or more embodiments of the invention, available payroll funds are equal to the gross payroll amount less any legacy withholdings. A debt amount may be an amount to be paid to a creditor using available payroll funds, reserve funds, and/or interim funds.

FIG. 1 shows a payroll withholding system (100) for payroll withholding for debt management in accordance with one or more embodiments of the invention. The payroll withholding system (100) includes a computer system (102), an employer (122), an employee (130), one or more creditors (e.g., creditor 1 (140), creditor Y (150)), a direct deposit service (170), a bank (172), and, optionally, an escrow account (110). The employer (122) includes an employer application (126), and the employee (130) includes an employee application (132). Each creditor (e.g., creditor 1 (140), creditor Y (150)) includes a creditor application (e.g., creditor application 1 (142), creditor application Y (152)). The computer system (102) includes an application (104), a CPU (114), a storage repository (116), memory (118), an application interface (120), and, optionally, a security module (180). The application (104) includes a payroll calculator (106), a financial advice engine (108), a payment calculator (110), and a payroll funds coordinator (112). Each of these components is described with respect FIG. 1 below.

The payroll withholding system (100) may be a separate system, a plug-in of another system, a web-based service, a service residing on a desktop computer, a framework for other platforms to utilize, or configured in any other suitable way. One of ordinary skill in the art will appreciate that embodiments of the invention are not limited to the configuration shown in FIG. 1.

In one or more embodiments of the invention, the employer (122) is any entity that pays one or more employees (130) for services performed by the employee (130) on behalf of the employer (122). The employer (122) is configured to interact with the computer system (102) using the employer application (126). More specifically, the employer (122) may be an entity using an employer system (not shown) that includes the employer application (126). The employer system may be, or may contain a form of, an internet-based or an intranet-based communication device that is capable of communicating with the employer application (126). Examples of an employer system include, but are not limited to, a desktop computer with internet or intranet access, a laptop computer with internet or intranet access, a smart phone, and a personal digital assistant (PDA). The employer system may be operated by the employer (122), which may include, but is not limited to, an individual, a group, an organization, or some other legal entity. In one or more embodiments of the invention, the employer application (126) is configured to send withholding information to, and receive withholding information from, the application interface (120) of the computer system (102) and the employee application (132). The employer application (126) may be configured to format the withholding information sent and received by the employer (122) so that the information is readable by the employer (122) and/or the recipient.

In one or more embodiments of the invention, the employer application (126) is configured to display web page(s) (i.e., web content). More specifically, the employer application (126) is any application capable of rendering Hypertext Markup Language (HTML). For example, the employer application (126) may be a web browser(s) used by the employer system to access web pages (i.e., web content) over the Internet (or other Wide Area Network or Local Area Network). The employer application (126) may also be configured to display data in other formats, including but not limited to JavaScript®, JavaScript® Object Notation (JSON) and Extensible Markup Language (XML). (JavaScript is a registered trademark and service mark of Sun Microsystems of Santa Clara, Calif.) The employer application (126) may be executing the employer system. Further, in one or more embodiments of the invention, the computer system (102) is configured to interact with the employer system through use of notifications. The notifications may be conveyed by electronic mail, short message service (SMS), alert boxes, pop-up windows, persistent to-do items, or some other form of correspondence.

In one or more embodiments of the invention, the employer application (126) provides support for browser extension(s). More specifically, the employer application (126) may provide an open framework for adding features to the employer application (126). In this case, a browser extension may be an application that extends the functionality of an employer application (126) using the open framework. The employer application (126) may interact with the computer system (102) using the browser extension(s). Further, the browser extension(s) may be configured to interact with a user interface of the employer application (126).

In one or more embodiments of the invention, the employee (130) is configured to interact with the computer system (102) using an employee application (132). More specifically, the employee (130) may be an entity using an employee system (not shown) that includes the employee application (132). The employee (130) is an individual, a group, an organization, or some other legal entity on the payroll of the employer (122). The employee (130) may also be a family member of the employee, a person residing at the same residence (e.g., household members) as the employee, a person who is a legal guardian of the employee (130), a dependent of the employee, a person sharing a debt obligation of the employee (130), or some other person associated with the employee (130). An employee (130) may have more than one employer (122). The employee system may be, or may contain a form of, an internet-based or an intranet-based communication device that is capable of communicating with the employee application (132). Examples of an employee system include, but are not limited to, a desktop computer with internet or intranet access, a laptop computer with internet or intranet access, a smart phone, and a personal digital assistant (PDA). The employee system may be operated by the employee (130). In one or more embodiments of the invention, the employee (130) is employed by the employer (122). The employee application (132) may be configured to send withholding information to, and receive withholding information from, the application interface (120) of the computer system (102), the bank (172), one or more creditor applications (e.g., creditor application 1 (142), creditor application Y (152)), and the employee application (132). The withholding information sent by the employee (130) may include parameters regarding debt information and/or payroll information of the employee (130). A parameter may be, for example, how much to pay a creditor, a condition when a creditor should not be paid, and other conditions and/or sets of rules regarding debt information and/or payroll information of the employee (130). The employee application (132) may be configured to format the withholding information sent and received by the employee (130) so that the information is readable by the employee (130) and/or the recipient.

In one or more embodiments of the invention, the employee application (132) is configured to display web page(s) (i.e., web content). More specifically, the employee application (132) may be any application capable of rendering Hypertext Markup Language (HTML). For example, the employee application (132) may be a web browser(s) used by the employee system to access web pages (i.e., web content) over the Internet (or other Wide Area Network or Local Area Network). The employee application (132) may also be configured to display data in other formats, including but not limited to JavaScript®, JavaScript® Object Notation (JSON) and Extensible Markup Language (XML). The employee application (132) may be executing on the employee system. Further, in one or more embodiments of the invention, the computer system (102) is configured to interact with the employee system through use of notifications. The notifications may be conveyed by electronic mail, short message service (SMS), alert boxes, pop-up windows, persistent to-do items, or some other form of electronic correspondence.

In one or more embodiments of the invention, the employee application (132) provides support for browser extension(s). More specifically, the employee application (132) may provide an open framework for adding features to the employee application (132). In this case, a browser extension may be an application that extends the functionality of an employee application (132) using the open framework. The employee application (132) may interact with the computer system (102) using the browser extension(s). Further, the browser extension(s) may be configured to interact with a user interface of the employee application (132).

In one or more embodiments of the invention, each creditor (e.g., creditor 1 (140), creditor Y (150)) is an entity of some kind (e.g., a person, a vendor, a lender, etc.) to which the employee (130) has an obligation. Examples of a creditor (e.g., creditor 1 (140), creditor Y (150)) include, but are not limited to, a mortgage company, a credit card company, a store or other vendor, a person, a bank, a government entity, and a corporate entity. The obligation may be money, a good, a service, some other commitment, or any suitable combination thereof. Each creditor (e.g., creditor 1 (140), creditor Y (150)) may communicate with another creditor (e.g., creditor 1 (140), creditor Y (150)), the employee (130), the computer system (102), and, optionally, the escrow account (110). Each creditor (e.g., creditor 1 (140), creditor Y (150)) may communicate using a communication device (not shown), including but not limited to a smart device, a desktop computer, a laptop computer, a smart phone, a mobile phone, and a personal digital assistant (PDA).

In one or more embodiments of the invention, the communication device used by a creditor (e.g., creditor 1 (140), creditor Y (150)) includes a creditor application (e.g., creditor application 1 (142), creditor application Y (152)). Each creditor application (e.g., creditor application 1 (142), creditor application Y (152)) may be configured to send withholding information to, and receive withholding information from, the application interface (120) of the computer system (102), the employee application (132), and (optionally) the escrow account. Each creditor application (e.g., creditor application 1 (142), creditor application Y (152)) may be configured to format the withholding information sent and received by the creditor (e.g., creditor 1 (140), creditor Y (150)) so that the information is readable by the creditor (e.g., creditor 1 (140), creditor Y (150)) and/or the recipient.

In one or more embodiments of the invention, each creditor application (e.g., creditor application 1 (142), creditor application Y (152)) is configured to display web page(s) (i.e., web content). More specifically, each creditor application (e.g., creditor application 1 (142), creditor application Y (152)) may be any application capable of rendering Hypertext Markup Language (HTML). For example, each creditor application (e.g., creditor application 1 (142), creditor application Y (152)) may be a web browser(s) used by the employee system to access web pages (i.e., web content) over the Internet (or other Wide Area Network or Local Area Network). Each creditor application (e.g., creditor application 1 (142), creditor application Y (152)) may also be configured to display data in other formats, including but not limited to JavaScript®, JavaScript® Object Notation (JSON) and Extensible Markup Language (XML). Each creditor application (e.g., creditor application 1 (142), creditor application Y (152)) may be executing on the employee system. Further, in one or more embodiments of the invention, the computer system (102) is configured to interact with the creditor system through use of notifications. The notifications may be conveyed by electronic mail, short message service (SMS), alert boxes, pop-up windows, persistent to-do items, or some other form of electronic correspondence.

In one or more embodiments of the invention, each creditor application (e.g., creditor application 1 (142), creditor application Y (152)) provides support for browser extension(s). More specifically, each creditor application (e.g., creditor application 1 (142), creditor application Y (152)) may provide an open framework for adding features to each creditor application (e.g., creditor application 1 (142), creditor application Y (152)). In this case, a browser extension may be an application that extends the functionality of each creditor application (e.g., creditor application 1 (142), creditor application Y (152)) using the open framework. Each creditor application (e.g., creditor application 1 (142), creditor application Y (152)) may interact with the computer system (102) using the browser extension(s). Further, the browser extension(s) may be configured to interact with a user interface of each creditor application (e.g., creditor application 1 (142), creditor application Y (152)).

In one or more embodiments of the invention, communication between the computer system (102), the employer (122), the employee (130), the one or more creditors (e.g., creditor 1 (140), creditor Y (150)), the direct deposit service (170), the bank (172), and/or the optional escrow account (110) may occur via a network (not shown). The network may be a wide area network (WAN), a metropolitan area network (MAN), a local area network (LAN), a public network (such as the Internet or World Wide Web), a wireless network, a telephone network, or any suitable combination thereof. Further, the network may include one or more networks interconnected by other network types (e.g., distinct LANs connected by one or more WANs).

In one or more embodiments of the invention, the direct deposit service (170) is an entity that receives money (e.g., available payroll funds less the debt payment) from the computer system (102) and distributes the money according to pre-defined instructions. The money may be received from the computer system (102) as a payment owed by the employer (122) to an employee (130), where the payment may be, for example, a paycheck, a bonus, or a reimbursement for expenses. The direct deposit service (170) may be a third party relative to the computer system (102) and/or the employer (122). Alternatively, the direct deposit service (170) may be part of the employer (122) (e.g., payroll department, accounting department) and/or the computer system (102). The pre-defined instructions received from the computer system (102) by the direct deposit service (170). The pre-defined instructions may originate from the employer (122), the employee (130), a third party (not shown), or any suitable combination thereof. The pre-defined instructions may include withholdings, such as legacy withholdings, and/or other instructions designating where all or a portion of the money received from the computer system (102) should be distributed. In one or more embodiments of the invention, the direct deposit service (170) uses an application (not shown) to send withholding information to, and receive withholding information from, the computer system (102) and the bank (172).

In one or more embodiments of the invention, the bank (172) stores money for, and at the direction of, a customer, such as the employee (130). The bank may be a physical entity or a virtual entity (e.g., an online bank). The bank (172) may send and receive money physically and/or electronically. Electronic money transfers may include a direct deposit representing the net pay owed by the employer (122) to the employee (130) from a direct deposit service (170). The bank (172) may have multiple accounts held by the employee (130). The bank (172) may also offer a number of different account types (e.g., savings, checking, CD, mortgage, loan) that the customer (130) may hold within each account. In one or more embodiments of the invention, the bank (172) uses an application (not shown) to send withholding information to, and receive withholding information from, the computer system (102), the employee application (132), and the direct deposit service (170).

Optionally, in one or more embodiments of the invention, the escrow account (110) is configured to hold funds (e.g., the debt amount) due to one or more creditors (e.g., creditor 1 (140), creditor Y (150)) before payment is due to the one or more creditors (e.g., creditor 1 (140), creditor Y (150)). The escrow account (110) may be configured to receive the funds from the application interface (120) of the computer system (102). The escrow account (110) may be an interest-bearing account, the accumulated interest from which may belong to the employee. In one or more embodiments of the invention, the accumulated interest is added to the reserve funds (described below). The escrow account (110) may be owned and/or managed by a third party (not shown). The funds in the escrow account (110) may be released on the date that payment of the debt is due by the manager (e.g., escrow agent, bank) of the escrow account (110) or by the employee (130). The escrow account (110) may be configured to retain a portion of the funds as a fee for the manager of the escrow account (110).

In one or more embodiments of the invention, the escrow account (110) may be configured to hold funds for more than one creditor (e.g., creditor 1 (140), creditor Y (150)) and release a portion of the funds at a point in time when the portion is due to the appropriate creditor (e.g., creditor 1 (140), creditor Y (150)). The escrow account (110) may also be configured to hold reserve funds (e.g., an amount in excess of the debt amount that is taken from the available payroll funds), where the reserve funds may be used, for example, as interim funds when the amount of available payroll funds reaches a shortfall at some point in the future. The escrow account (110) may or may not involve an escrow arrangement. In other words, in one or more embodiments of the invention, the escrow account (110) is a standard account without an escrow component. The account holding the reserve funds may be called a reserve account, which may be the same as the escrow account (110), or a separate account.

Those skilled in the art will appreciate that the computer system (102) may also be implemented as a browser extension. In this case, the employee application (132), one or more of the creditor applications (e.g., creditor application 1 (142), creditor application Y (152)), and/or the employer application (126) may interact directly with the computer system (102) as a browser extension.

In one or more embodiments of the invention, the computer system (102) is configured to interact with the employee application (132), one or more of the creditor applications (e.g., creditor application 1 (142), creditor application Y (152)), the employer application (126), the direct deposit service (170), the bank (172), and (optionally) the escrow account (110) using the application interface (120). Specifically, the application interface (120) of the computer system (102) is configured to receive input from and send output to the employee application (132), one or more of the creditor applications (e.g., creditor application 1 (142), creditor application Y (152)), the employer application (126), and an application in the direct deposit service (170), the bank (172), and (optionally) the escrow account (110).

In one or more embodiments of the invention, the computer system (102) is part of a payroll system (not shown) used by the employer (122). In one or more embodiments of the invention, the payroll system receives the gross payroll amount and applies the legacy withholdings to arrive at the available payroll funds. The computer system (102) may also be a third party system relative to the payroll system used by the employer (122). In the latter case, the payroll system sends the available payroll funds and the legacy withholding information to the computer system (102) through the application interface (120). In addition, in the latter case, recommendations and/or implementations of a strategy generated by the computer system (102) (described below), may be sent to the employee (130), the payroll system, the employer (122), another entity, or any suitable combination thereof.

In one or more embodiments of the invention, the information received by the application interface (120) is a withholding election from the employee (130). The information sent by the application interface (120) may be a dynamic notification, an update, an alert, a confirmation, another type of information, or any suitable combination thereof. The application interface (120) may receive information from the direct deposit service (170), the bank (172), and/or, optionally, the escrow account (110). The information sent by the application interface (120) of the computer system (102) may specify, but is not limited to, the employee (130), the employer (122), a creditor (e.g., creditor 1 (140), creditor Y (150)), a Uniform Resource Identifier (URI) (e.g., a Uniform Resource Locator (URL), a web address, etc.), data generated by the financial advice engine (108), the payroll funds coordinator (112), some other application or source of information, or any suitable combination thereof.

In one or more embodiments of the invention, the data transferred among the application interface (120), the employee application (132), one or more of the creditor applications (e.g., creditor application 1 (142), creditor application Y (152)), and/or the employer application (126) corresponds to metadata associated with employee payroll and/or payroll withholding information. Optionally, the data transferred may also include additional metadata describing the data specified in the employee payroll and/or payroll withholding information (i.e., the additional metadata may provide context for the specified data.) In one or more embodiments of the invention, the computer system (102) is configured to support various data formats provided by the employee application (132), one or more of the creditor applications (e.g., creditor application 1 (142), creditor application Y (152)), and/or the employer application (152), as well as an application of the direct deposit service (170), the bank (172), and (optionally) the escrow account (110).

In one or more embodiments of the invention, the computer system (102) is configured to retrieve and store payroll data and withholding information for each employee (e.g., employee (130)). More specifically, the computer system (102) may be configured to use the payroll funds coordinator (112) of the application (104) to retrieve and store payroll and withholding data in the storage repository (116). The payroll and withholding data may contain details about payroll-related information with respect to an employee (e.g., employee 1 (130)) and/or the employer (122).

In one or more embodiments of the invention, the storage repository (116) is a persistent storage device (or set of devices) and is configured to store withholding information, as defined above. Examples of a storage repository (116) include, but are not limited to, a data base, a file system, a hard drive, some other form of data storage, or any suitable combination thereof.

In one or more embodiments of the invention, the CPU (i.e., central processing unit) (114) of the computer system (102) is configured to execute instructions to operate the application (104) and its components (e.g., payroll calculator (106), financial advice engine (108)), the application interface (120), and the storage repository (116).

In one or more embodiments of the invention, the application (104) is configured to coordinate the payroll calculator (106), the financial advice engine (108), the payment calculator (110), and the payroll funds coordinator (112). In one or more embodiments of the invention, the payroll funds coordinator (112) of the application (104) is configured to coordinate the transfer of payroll and withholding data between the application interface (120), the storage repository (116), and the other components of the application (104). More specifically, the payroll funds coordinator (112) may be configured to receive withholding information from the application interface (120) and store the withholding information in the storage repository (116). Further, the payroll funds coordinator (112) may be configured to retrieve withholding information from the storage repository (116) for use by the payroll calculator (106). The payroll funds coordinator (112) may also be configured to retrieve withholding information from the storage repository (116) to be sent to the employee (130), one or more of the creditors (e.g., creditor 1 (140), creditor Y (150)), the employer (122), the direct deposit service (170), the bank (173), or, optionally, the escrow account (110) using the application interface (120).

In one or more embodiments of the invention, the payroll funds coordinator (112) is configured to retrieve withholding information (e.g., employee payroll information, employee debt information) stored in the storage repository (116) and send withholding information to the storage repository (116) for storage. The payroll funds coordinator (112) may also be configured to send instructions and withholding information to the payroll calculator (106), the financial advice engine (108), and the payment calculator (110). The payroll funds coordinator (112) may further be configured to receive output (e.g., forms of withholding information) from the payroll calculator (106), the financial advice engine (108), and the payment calculator (110). For example, the payroll funds coordinator (112) may be configured to receive an amount of available payroll funds from the payroll calculator (108) and a debt amount from the payment calculator (110). Further, the payroll funds coordinator (112) may be configured to determine whether the amount of available payroll funds is greater than the debt amount. The payroll funds coordinator (112) may also be configured to extract (such as, by deducting) the debt amount from the amount of available payroll funds to leave a payroll balance (i.e., the amount sent to the employee (130)).

In one or more embodiments of the invention, the payroll funds coordinator (112) is configured to run payroll. The payroll funds coordinator (112) may also be configured to send a confirmation to the employee (130) when a creditor (e.g., creditor 1 (140), creditor Y (150)) receives the debt amount. The payroll funds coordinator (112) may also be configured to transfer the debt amount to the escrow account (110) prior to sending the debt amount to a creditor (e.g., creditor 1 (140), creditor Y (150)) on a due date. The payroll funds coordinator (112) may also be configured to transfer the payroll balance to an account (e.g., direct deposit service (170), bank (172)) on behalf of the employee (130). The payroll funds coordinator (112) may also be configured to send terms for interim funds to the employee (130). The payroll funds coordinator (112) may further be configured to receive acceptance of the terms for interim funds from the employee (130) and send the interim funds with the debt amount to a creditor (e.g., creditor 1 (140), creditor Y (150)) of the employee (130) to fulfill a financial obligation. In one or more embodiments of the invention, a fee is charged to the employee (130) each time the payroll funds coordinator (112) transfers money to any entity, including but not limited to a creditor (e.g., creditor 1 (140), creditor Y (150)), the direct deposit service (170), the bank (172), the employee (130), and the escrow account (110).

In one or more embodiments of the invention, the payroll funds coordinator (112) is also configured to calculate estimates of payroll. Estimates of payroll may be calculated on any of a number of basis, including but not limited to weekly, bi-monthly, monthly, quarterly, semi-annually, and annually. The purpose of an estimate of payroll may be to determine an average payroll over a period of time. The average payroll may be used (for example, by the financial advice engine (108)) to develop a debt reduction strategy/plan and to provide one of a number of recommendations, such as setting aside an amount of the available payroll funds beyond the debt amount as reserve funds in case interim funds are needed at some point in the future. Reserve funds may be developed, for example, when the employee receives paycheck amounts that fluctuate over the course of a year.

Instructions sent by the payroll funds coordinator (112) may be received at the direction of the employee (130) through the application interface (120). Instructions sent by the payroll funds coordinator (112) may also be sent according to some protocol, established by the employee (130), based on a predetermined event (e.g., the employee receiving a discretionary bonus, a change in legislation related to consumer credit cards, a new industry trend in home mortgages), based on a set period of time (e.g., every two weeks to coincide with an employee paycheck), set by default, or set according to some other trigger. The payroll funds coordinator (112) may also be configured to instruct the application interface (120) to communicate with third parties (not shown), including but not limited to an entity associated with a legacy withholding, a mortgage company, a broker, and an agent.

In one or more embodiments of the invention, the payroll calculator (106) is configured to receive payroll information of an employee (130) and perform calculations with regard to the payroll information. Calculations of the payroll information may include, but are not limited to, gross payroll, legacy withholdings, non-legacy withholdings, an amount of available payroll funds, and net pay. The payroll calculator (106) may also be able to estimate future payroll events of the employee (130), such as annual raises, projected expense reimbursements, tax consequences of a large bonus. The payroll calculator (106) may be configured to receive withholding information from the payroll funds coordinator (112). The payroll calculator (106) may also be configured to receive instructions from the payroll funds coordinator (112) to perform calculations related to payroll data of the employee based on actual information, projected information, hypothetical information, or any reasonable combination thereof. The payroll calculator (106) may also be configured to send any and all calculations performed by the payroll calculator (106) to the payroll funds coordinator (112).

In one or more embodiments of the invention, the financial advice engine (108) is configured to provide analysis and recommendations related to debts of the employee (130) for the employee (130). Specifically, the financial advice engine (108) may be configured to analyze one or more debts owed by the employee (130). The analysis of each debt may involve any or all aspects of the debt and the terms of the debt, including but not limited to the interest rate, the principal amount, the minimum payment, and the term of the debt for a given payment stream. The financial advice engine (108) may also provide advanced analysis for a debt. For example, the financial advice engine (108) may consider recent legislation and industry trends, such as restructuring "upside-down" mortgages for homes with drastically lowered assessed values, a higher required minimum payment for credit card balances, and a balanced billing option for electric and/or natural gas service for residential customers.

In one or more embodiments of the invention, the financial advice engine (108) is also configured to analyze a potential debt contemplated by the employee (130). The financial advice engine (108) may seek more information from the employee (130) to determine whether the potential debt is necessary or merely a debt for a non-essential item or service. The financial advice engine (108) may provide a recommendation to the employee (130) regarding whether to commit to the potential debt based on a number of factors, including but not limited to the current debt obligations of the employee, an amount of reserve funds, and the average amount of available payroll funds. The financial advice engine (108) may also be configured to determine more advantageous debt options. Examples of more advantageous debt options may be proposing a restructured mortgage to a mortgage holder, finding a different credit card company that is willing to receive a transfer of a credit card balance for a lower interest rate, and consolidating debt.

The financial advice engine (108) may also be configured to perform analysis and/or offer recommendations regarding the payroll of the employee. Specifically, the financial advice engine (108) may analyze the legacy withholdings of the employee (130) and offer recommendations as to how to increase available payroll funds. For example, the financial advice engine (108) may determine that the employee (130) should increase the number of exemptions for federal tax purposes to increase the amount of available payroll funds every month and decrease the refund that the employee (130) receives on the employee's federal tax return. As another example, the financial advice engine (108) may determine that a third party medical insurance, independent of the provider of the medical insurance offered through the employer (122) of the employee (130), offers better coverage for a lower monthly premium.

Continuing with the financial advice engine (108), in one or more embodiments of the invention, any analysis performed by the financial advice engine (108), as well as any recommendations provided by the financial advice engine (108), are specific to the employee (130) based on the withholding information of the employee (130). An example of a recommendation by the financial advice engine (108) may be searching for and obtaining interim funding when debt obligations exceed an amount of available payroll funds. Another example of a recommendation by the financial advice engine (108) may be creating reserve funds, which may be used at a later time when interim funds are needed. Specifically, the financial advice engine (108) may be configured to require that an amount of the available payroll funds be automatically set aside by the payroll funds coordinator (112) into an account (e.g., the escrow account (110), some other account) so that the reserve funds may be used when interim funds are required. The financial advice engine (108) may also be configured to determine whether the cause of the use of interim funds and/or reserve funds is due to a necessary item or a discretionary item. If the cause is due to a discretionary item, then the financial advice engine (108) may provide a recommendation to the employee (130) to eliminate the debt obligation by, for example, returning an item or deferring purchase of an item to a later date.

In one or more embodiments of the invention, the financial advice engine (108) is also configured to establish other types of goals, including but not limited to savings goals (including, for example, establishment of reserve funds in a reserve account), debt management and/or reduction goals, and retirement goals. The financial advice engine (108) may also be configured to adjust, terminate, suspend, and/or reinstate the implementation of certain goals, depending on a particular situation. For example, initially, the financial advice engine (108) may establish a retirement goal, which is executed by regular contributions (legacy withholding) to the employee's 401(k) account with his employer (122). Six months later, the employee (130) is forced to take a medical leave from work for three months, and so the employee's income is reduced during the medical leave. The financial advice engine (108) may determine that the contributions to the 401(k) plan should be suspended so that the amount of available payroll funds is sufficient to cover the debt amount while the employee (130) is on medical leave. When the employee (130) returns from medical leave to regular employment status (i.e., when a condition that caused the goal to be suspended ceases to exist), then the financial advice engine (108) may reinstate the contributions to the 401(k) (i.e., reinstate the retirement goal), thus increasing the legacy withholdings to its levels prior to the medical leave.

In one or more embodiments of the invention, in order to provide recommendations that can realistically be implemented, the financial advice engine (108) is also configured to incorporate one or more rules and regulations that may affect a recommendation. The one or more rules may be obtained, using the application interface (120), from the employee (130), the employer (122), a creditor (e.g., creditor 1 (140), creditor Y (150)), a bank (172), an external sources, or any other suitable source able to provide a rule. A rule may be procedural (e.g., the length of time it takes for contribution changes to an employee's 401(k) plan to take effect), legal (e.g., the maximum amount of pre-tax dollars that allowed to be withheld from an employee's paycheck for medical reimbursement for the current year), or any other type of rule that may apply to a recommendation.

In one or more embodiments of the invention, any analysis and/or recommendation provided by the financial advice engine (108) may include all support and detail of all options considered. The analysis and/or recommendations may also include benefits and drawbacks for each option considered. The financial advice engine (108) may further be configured to provide a recommendation for the employee (130) regarding an analysis of one or more options. The financial advice engine (108) may be configured to receive withholding information from the payroll funds coordinator (112).

In one or more embodiments of the invention, the financial advice engine (108) is also configured to receive instructions from the payroll funds coordinator (112) to perform analysis and/or recommendations related to payroll data and/or debt obligations of the employee (130) based on actual information, projected information, hypothetical information, or any reasonable combination thereof. The financial advice engine (108) may also be configured to send any and all analysis and/or recommendations performed by the financial advice engine (108) to the payroll funds coordinator (112). When a recommendation is accepted, or if there is a desired change to current information (e.g., debt information, legacy withholdings), the financial advice engine (108) may be configured to generate the paperwork required to make the desired change and send the paperwork to the appropriate entity(ies) using the application interface (120).

In one or more embodiments of the invention, the financial advice engine (108) is also configured to provide information and recommendations to an employee (130) whose entire household income and related information (e.g., number of dependents in household) is provided to the computer system (102). For example, the financial advice engine (108) may provide information and recommendations with regard to government programs available to the employee (130). As a more specific example, the financial advice engine (108) may provide details to the employee (130) about the Advanced Earned Income Credit (AEIC) for poor working families. The AEIC may provide benefits to the employee (130) beyond decreasing withholding taxes, such as an immediate credit on current paychecks.

In one or more embodiments of the invention, the payment calculator (110) is configured to receive debt information of an employee (130) and perform calculations with regard to the debt information. Calculations of the debt information may include, but are not limited to, principal of the debt, interest rate and any future variations of the interest rate, past payments made, penalties for lack of payment/underpayment, and past purchases (as for a credit card). The payment calculator (110) may also be able to calculate debt based on estimated future payments by the employee, projected minimum payment requirements for a debt, and other debt calculations needed for planning purposes. The payment calculator (110) may be configured to receive withholding information from the payroll funds coordinator (112). The payment calculator (110) may also be configured to receive instructions from the payroll funds coordinator (112) to perform calculations related to debt information of the employee (130) based on actual information, projected information, hypothetical information, or any reasonable combination thereof. The payment calculator (110) may also be configured to send any and all calculations performed by the payment calculator (110) to the payroll funds coordinator (112).

In one or more embodiments of the invention, the CPU (114) of the computer system (102) is configured to execute one or more applications. Specifically, the CPU (114) may be configured to execute the application (104) and the application interface (120). The CPU (114) may be a central processing unit, a multi-core processing chip, or a multi-chip module containing multiple multi-core processing chips. Those skilled in the art will appreciate that the CPU (114) may be known by other names, including but not limited to a processor, a microprocessor, and a multi-core processor. In one or more embodiments of the invention, the CPU (114) is configured to execute software instructions stored in memory (118). The memory (118) may include one or more cache memories, main memory, and/or any other suitable type of memory. The memory (118) may be discretely located on the computer system (102) relative to the CPU (114). The memory (118) may also be integrated with the CPU (114).

Optionally, in one or more embodiments of the invention, the security module (180) is configured to secure interactions between the application interface (120) and the employee application (132), one or more creditor applications (e.g., creditor application 1 (142), creditor application Y (152)), the employer application (152), the direct deposit service (170), the bank (172), and/or, optionally, the escrow account (110). More specifically, the security module (180) may be configured to authenticate communication from the applications based on security keys verifying the identity of the source of the communication. For example, an employer application (126) may be associated with a security key enabling the employer application (126) to interact with the application interface (120). Further, the security module (180) may be configured to restrict requests for withholding information and access to withholding information. For example, the employee application (132) associated with the employee (130) may be restricted to only provide specific withholding information. Further, the employee application (132) associated with a particular employee (e.g., employee (130)) may be restricted to only access withholding information associated with that particular employee (e.g., employee 1 (130)).

Those skilled in the art will appreciate that the employee application (132), one or more creditor applications (e.g., creditor application 1 (142), creditor application Y (152)), the employer application (152), the direct deposit service (170), the bank (172), and/or, optionally, the escrow account (110) may be configured to interact with the computer system (102) using a browser extension. In this case, the browser extension may maintain an active session with the computer system (102) after the security module (180) has authenticated the employee application (132), (e.g., creditor application 1 (142), creditor application Y (152)), the employer application (152), the direct deposit service (170), the bank (172), and/or, optionally, the escrow account (110). For example, the browser extension may continue to interact with the computer system (102) as the employee (130) views various web content in the employee application (132). In this example, the browser extension may receive notifications from the computer system (102) for presenting to the employee (130).

Figure 2A:
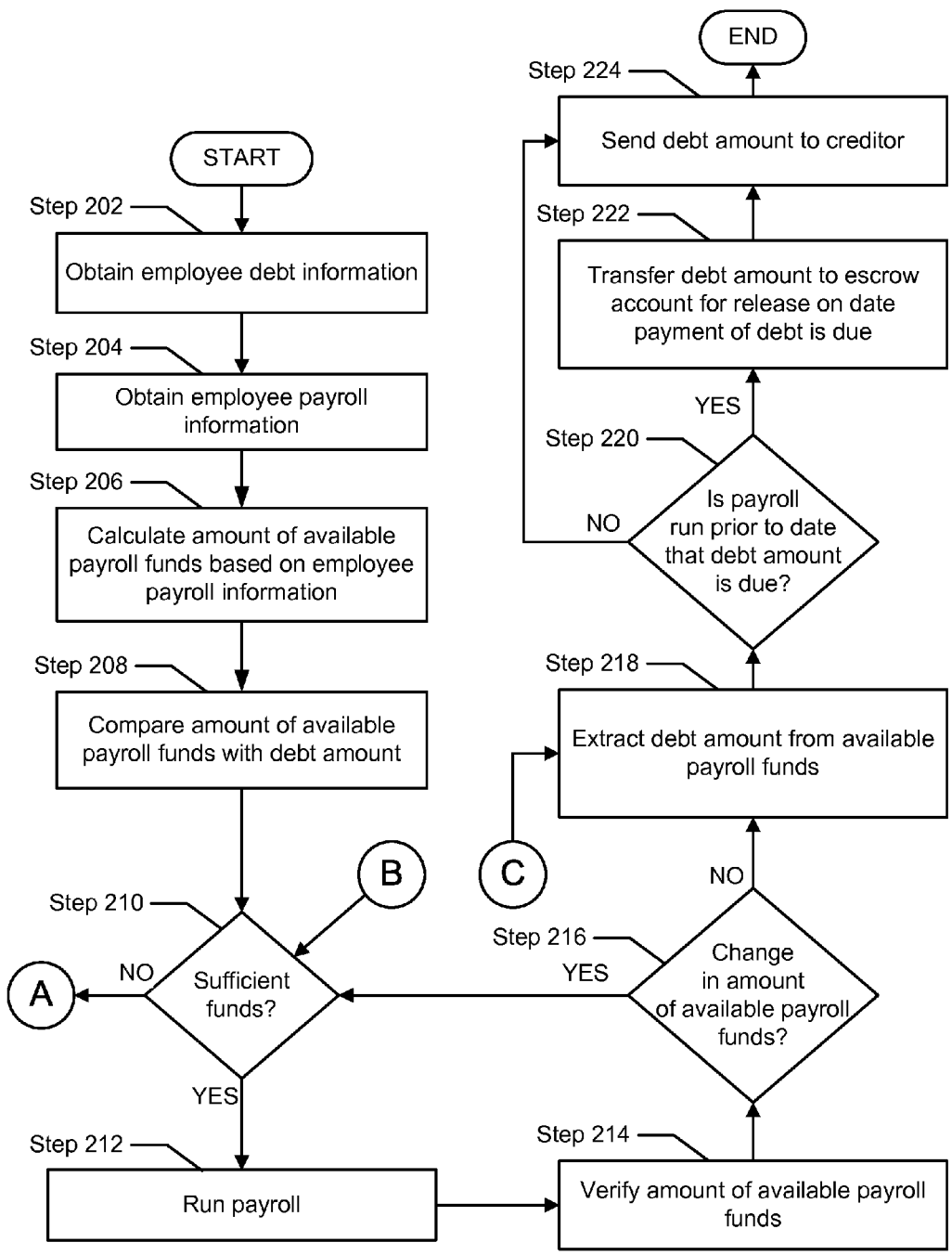
FIGS. 2A and 2B show a flowchart for a method of payroll withholding for debt management in accordance with one or more embodiments of the invention.
Figure 2B:
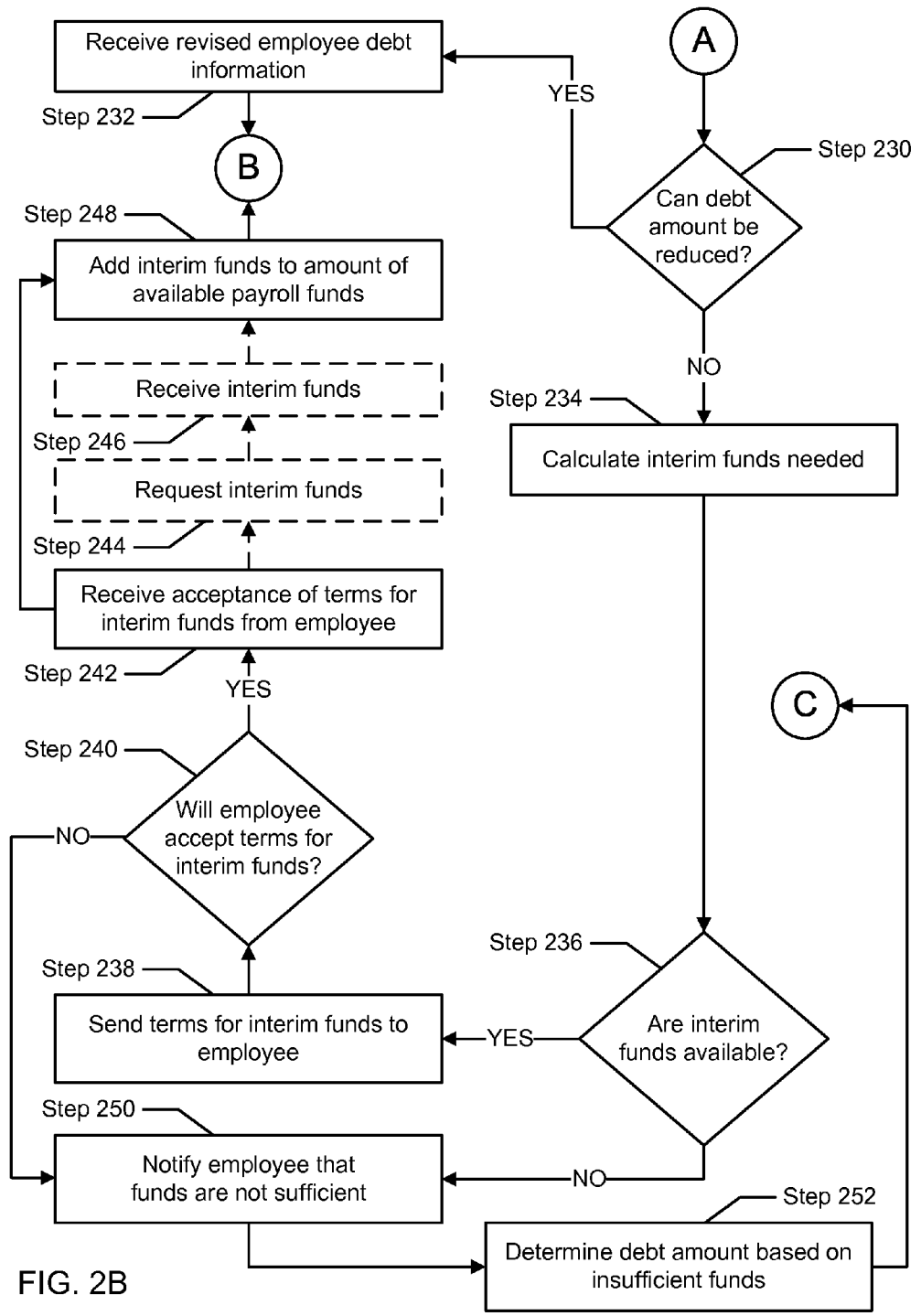

FIGS. 2A and 2B show a flowchart of a method for automated bill pay in accordance with one or more embodiments of the invention. While the various steps in this flowchart are presented and described sequentially, one of ordinary skill will appreciate that some or all of the steps may be executed in different orders, may be combined or omitted, and some or all of the steps may be executed in parallel. Further, in one or more of the embodiments of the invention, one or more of the steps described below may be omitted, repeated, and/or performed in a different order. In addition, a person of ordinary skill in the art will appreciate that additional steps, omitted in FIGS. 2A and 2B, may be included in performing this method. Accordingly, the specific arrangement of steps shown in FIGS. 2A and 2B should not be construed as limiting the scope of the invention. The method described in FIGS. 2A and 2B may apply to any period of time, including but not limited to a current pay period or an average pay period over a period of time. The method described in FIGS. 2A and 2B may also apply to actual numbers, forecast numbers, or any suitable combination thereof.

Referring to FIG. 2A, in Step 202, employee debt information is obtained. The employee debt information may include the balance owed on the debt, the minimum required payment of the debt, the frequency of payment required for the debt, the interest rate applied to the debt, and any other information associated with the employee debt. The employee debt information may include any change to the employee debt information, such as a change in the interest rate applied to the debt. The employee debt information may be received from the employee (i.e., the debtor), the creditor, or any other suitable entity. The debt associated with the employee debt information may be repayment of a loan, a payment for services rendered, or some other legal obligation that must be satisfied by the employee. The employee debt information may be associated with an existing debt or a debt to start at a future date. The debt associated with the employee debt information be a proposed debt (i.e., a legal obligation has not yet been formed between the debtor and the creditor). In one or more embodiments of the invention, a particular computing device, as described, for example, in FIG. 5 below, is used to obtain the employee debt information.

In Step 204, employee payroll information is obtained. The employee payroll information may be received from the employee, the employer, or any other suitable entity. The employee payroll information may include withholding information, such as legacy withholdings that currently apply to the employee's wages. The employee payroll information may include the employee's wages (e.g., salary, hourly wage), expense allowances, bonus payments, and/or any other form of payment made by the employee's employer to the employee. The employee payroll information may include any change to the employee payroll information, such as a salary increase. In one or more embodiments of the invention, a particular computing device, as described, for example, in FIG. 5 below, is used to obtain the employee payroll information.

In Step 206, the amount of available payroll funds is calculated based on the employee payroll information. In one or more embodiments of the invention, the employee's gross pay is reduced by an amount associated with the legacy withholdings for the employee to obtain the amount of available payroll funds. As explained above, the legacy withholdings may be mandatory (e.g., federal tax withholding, alimony payment) or voluntary (e.g., health insurance premium, 401(k) contribution). A change to the employee payroll information may result in a recalculation of the amount of available payroll funds. In one or more embodiments of the invention, a particular computing device, as described, for example, in FIG. 5 below, is used to calculate the amount of available payroll funds based on the employee payroll information.

In Step 208, the amount of available payroll funds is compared with the debt amount. The debt amount may be the sum of all (i.e., the entire balance) or a portion (e.g., minimum payment) of each debt owed by the employee. The debt amount may include some or all of the debts incurred by the employee. The debt amount may include current debts, future debts, proposed debts, or any suitable combination thereof. The determination of the amount of each individual debt that contributes to the debt amount may be made by the employee, automatically, or in combination. Such determination may be made at any time and/or for any duration. In one or more embodiments of the invention, the comparison of the debt amount with the amount of available payroll funds occurs any time new payroll funds are received (e.g., a new pay period) and/or any time the employee debt information changes (e.g., the employee incurs a new debt obligation, the interest rate for an existing debt obligation changes). In one or more embodiments of the invention, a particular computing device, as described, for example, in FIG. 5 below, is used to compare the amount of available payroll funds with the debt amount.

In Step 210, a determination is made as to whether the payroll funds are sufficient. In one or more embodiments of the invention, payroll funds are the amount of available payroll funds, as described above. Payroll funds may be sufficient when the amount of payroll funds are greater than or equal to the debt amount. If the payroll funds are sufficient, then the process proceeds to Step 212. If the payroll funds are not sufficient, then the process proceeds to Step 230 in FIG. 2B. In one or more embodiments of the invention, a particular computing device, as described, for example, in FIG. 5 below, is used to determine whether the payroll funds are sufficient.

In Step 212, payroll is run. Payroll may be run whenever a new payroll event (e.g., pay period, bonus payment, expense reimbursement, etc.) occurs. Alternatively, payroll may be run at any other point in time. In one or more embodiments of the invention, a particular computing device, as described, for example, in FIG. 5 below, is used to run payroll. In Step 214, the amount of available payroll funds is verified. In one or more embodiments of the invention, the amount of available payroll funds in Step 212 is verified against the amount of available payroll funds in Step 206. In one or more embodiments of the invention, a particular computing device, as described, for example, in FIG. 5 below, is used to verify the amount of available payroll funds.

In Step 216, a determination is made as to whether there is a change in the amount of available payroll funds. A change in the amount of available payroll funds may be caused by a number of factors, including but not limited to a change in pay rate, an unexpected payment (e.g., discretionary bonus), or a change in one or more legacy withholdings. If there is a change in the amount of available payroll funds, then the process reverts to Step 210. If there is not a change in the amount of available payroll funds, then the process proceeds to Step 218. In one or more embodiments of the invention, a particular computing device, as described, for example, in FIG. 5 below, is determine if there is a change in the amount of available payroll funds. In Step 218, the debt amount is extracted (such as, by deducting) from the available payroll funds. In one or more embodiments of the invention, a particular computing device, as described, for example, in FIG. 5 below, is used to extract the debt amount from the available payroll funds.

In Step 220, a determination is made as to whether payroll has been run prior to the date that the debt amount is due. When the debt amount includes more than one debt obligation, then the date that each of the debt obligations is considered. The date that each of the debt obligations of the debt amount is due may be set by the employee, the creditor, or some other entity. If payroll has been run prior to the date that the debt amount is due, then the process proceeds to Step 222. If payroll has not been run prior to the date that the debt amount is due, then the process proceeds to Step 224. In one or more embodiments of the invention, a particular computing device, as described, for example, in FIG. 5 below, is used to determine whether payroll has been run prior to the date that the debt amount is due.

In Step 222, the debt amount is transferred to an escrow account for release on the date that payment of the debt amount is due. The escrow account may be an interest-bearing account, the accumulated interest from which may belong to the employee. The escrow account may be owned and/or managed by a third party. The debt amount may be released on the date that payment of the debt is due by the manager of the escrow account (e.g., escrow agent, bank) or by the employee. The manager of the escrow account may collect a fee for managing the escrow account. In cases where multiple debts are paid by the debt amount, the portion of the debt amount that corresponds to payment for one or more debts that is due on a particular day is paid on that particular day, and the remainder of the debt amount stays in the escrow account on that particular day. All or a portion of the debt amount may also be paid prior to the date that payment of the corresponding debt is due. In one or more embodiments of the invention, a particular computing device, as described, for example, in FIG. 5 below, is used to transfer the debt amount to an escrow account for release on the date that payment of the debt is due.

In Step 224, the debt amount is sent to the creditor. When there is more than one creditor, a portion of the debt amount is sent to each of the creditors in an amount corresponding to the debt owed for each particular creditor. In one or more embodiments of the invention, a particular computing device, as described, for example, in FIG. 5 below, is used to send the debt amount to the creditor. Upon completion of Step 224, the process ends.

In Step 230, referenced above with respect to Step 210, a determination is made as to whether the debt amount can be reduced. Determining whether the debt amount can be reduced may depend on a number of factors, including but not limited to whether the payment for each of the debt obligations is at the minimum payment allowed, whether a debt is actual or proposed, and whether a debt payment can be deferred. If the debt amount can be reduced, then the process proceeds to Step 232. If the debt amount cannot be reduced, then the process proceeds to Step 234. In one or more embodiments of the invention, a particular computing device, as described, for example, in FIG. 5 below, is used to determine whether the debt amount can be reduced.

In Step 232, revised employee debt information is received. The revised employee debt includes an adjustment to some or all of the factors listed above with respect to Step 230. The employee debt information may be revised by, and/or with the approval of, the employee. The employee debt information may be revised based on one or more changes made to the previous employee debt information. The revised employee debt information may be based on one or more recommendations to help reduce the debt amount so that the amount of available payroll funds can cover the debt amount. In one or more embodiments of the invention, a particular computing device, as described, for example, in FIG. 5 below, is used to receive the revised employee debt information.

In Step 234, interim funds that are needed are calculated. In one or more embodiments of the invention, the interim funds are needed to cover a shortfall of the amount of available payroll funds compared to the debt amount. The interim funds may be more than the difference between the debt amount and the amount of available payroll funds. The interim funds may include or be associated with an interest amount required with repayment. The interim funds may be an amount deposited into savings, a loan, a grant, or some other suitable type of funding. In one or more embodiments of the invention, a particular computing device, as described, for example, in FIG. 5 below, is used to calculate the interim funds needed.

In Step 236, a determination is made as to whether interim funds are available. A source of interim funds may be the employer of the employee, a current creditor of the employee, a bank, a government entity, or any other suitable entity capable of providing the interim funds. A source of interim funds may first review the credit and/or employment situation of the employee prior to making the interim funds available to the employee. The amount of interim funds made available may be different than the interim funds needed, as calculated above with respect to Step 234. The interim funds provided by a source may include a set of terms and conditions that must be met for the source to release the interim funds to the employee. If the interim funds are available, then the process proceeds to Step 238. If the interim funds are not available, then the process proceeds to Step 250. In one or more embodiments of the invention, a particular computing device, as described, for example, in FIG. 5 below, is used to determine whether the interim funds are available.

In Step 238, the terms for the interim funds are sent to the employee. The terms of the interim funds may be sent to the employee in a variety of formats, including but not limited to text, a chart, a table, and a spreadsheet. The interim funds may present a short-term solution for meeting debt payment, or the interim funds may be a long-term commitment. The interim funds sent to the employee may be chosen by a third party from among the available interim funds. The terms of potential interim funds may be in accordance with a recommendation received from a payroll withholding system, such as the payroll withholding system described above with respect to FIG. 1. In such a case, the interim funds may be chosen considering a set of criteria, such as interest rate, loan term, and how quickly the interim funds would be available. The set of criteria may be set by the third party, by the employee, by a creditor of the employee, or some other party. Terms for all potential sources of interim funds may also be sent to the employee. In such a case, the employee may select one or more interim funds.

Continuing with Step 238, each of the potential sources of interim funds sent to the employee may include a recommendation and/or an evaluation of the terms of the interim fund. Optionally, information may also be sent to the employee describing the implications of taking on additional debt by accepting the interim funds and offering advice, such as to how avoid needing interim funds in the future. Optionally, the payroll withholding system may recommend that the most advantageous option for the employee is, rather than secure interim funds, to make a late payment, including a late fee, to one or more of the creditors. In such a case, the payroll withholding system may evaluate its performance to determine, for example, whether it is receiving incomplete information or whether it has had enough time or been aggressive enough in building reserve funds to avoid interim funds or late payment fees. In one or more embodiments of the invention, a particular computing device, as described, for example, in FIG. 5 below, is used to send the terms for the interim funds to the employee.

In Step 240, a determination is made as to whether the employee accepts the terms for the interim funds. The determination as to whether the employee accepts the terms for the interim funds may be made upon receiving notification from the employee that the employee has agreed to accept the terms for one or more sources of interim funds. The determination may also be made upon receiving notification from the source of the interim funds that the employee committed to accept the terms for that source of interim funds. If the employee accepts the terms for the interim funds, then the process proceeds to Step 242. If the employee does not accept the terms for the interim funds, then the process proceeds to Step 250. In one or more embodiments of the invention, a particular computing device, as described, for example, in FIG. 5 below, is used to determine whether the employee accepts the terms for the interim funds.

In Step 242, acceptance of the terms for the interim funds is received from the employee. Acceptance may be an express statement of acceptance of the terms of the interim funds from the employee. Acceptance may also be a copy of a document, submitted by the employee or the source of the interim funds, showing that the employee is legally bound to receive the interim funds. Optionally, acceptance may be received from the source of the interim funds, either as confirmation of acceptance received from the employee or to establish employee's acceptance with receiving acceptance from the employee. In one or more embodiments of the invention, a particular computing device, as described, for example, in FIG. 5 below, is used to receive acceptance of the terms for the interim funds from the employee. Once acceptance of the terms for the interim funds from the employee have been received, the process proceeds to Step 248 or, optionally, to Step 244.

Optionally, in Step 244, after acceptance of the terms for the interim funds from the employee, the interim funds are requested. The interim funds may be requested from an entity with authority to provide the interim funds, such as the source of the interim funds, a broker, or an agent. This Step 244 is performed, for example, if the employee does not want to handle the interim funds. This Step 244 may also be performed when the source of the interim funds (e.g., the employer of the employee) also uses the payroll withholding for debt management service. In one or more embodiments of the invention, a particular computing device, as described, for example, in FIG. 5 below, is used to request the interim funds.

Optionally, in Step 246, after requesting the interim funds, the interim funds are received. The interim funds may be received from the same entity or a different entity than the entity to which the interim funds were requested in Step 244. All or a part of the interim funds may be received in one or more of a number of accounts owned by or managed on behalf of the employee, including but not limited to the employee's bank account, the escrow account, or an account established for the employee by the payroll withholding for debt management system. In one or more embodiments of the invention, a particular computing device, as described, for example, in FIG. 5 below, is used to receive the interim funds.

In Step 248, the interim funds are added to the amount of available payroll funds, as described above. In one or more embodiments of the invention, a particular computing device, as described, for example, in FIG. 5 below, is used to add the interim funds to the amount of available payroll funds. Once Step 248 is complete, the process reverts to Step 210.

In Step 250, the employee is notified that funds are not sufficient. In one or more embodiment of the invention, the employee is specifically notified that the interim funds, if available, are not enough to make up the shortfall of the available payroll funds relative to the debt amount. The employee may also be notified as to what amount the funds are deficient. In one or more embodiments of the invention, a particular computing device, as described, for example, in FIG. 5 below, is used to notify the employee that the funds are not sufficient.

In Step 252, the debt amount is determined based on the insufficient funds. The insufficient funds may be the amount of available payroll funds plus any available interim funds. In one or more embodiments of the invention, the debt amount is chosen by the employee. The debt amount may also be chosen from among the sources of debt based on a number of factors, including but not limited to whether current payment to a debt source eliminates the debt, whether payment to a debt source is already past due, the interest rate associated with a debt source, and penalties for not paying a debt source. In other words, the debt amount, and the sources of debt paid by the debt amount, may be determined to minimize the credit exposure and/or further damage to the credit rating of the employee. In one or more embodiments of the invention, a particular computing device, as described, for example, in FIG. 5 below, is used to determine the debt amount based on the insufficient funds. Upon completion of Step 252, the process reverts to Step 218.

The following describes an example in accordance with one or more embodiments of the invention. The example is for explanatory purposes only and is not intended to limit the scope of the invention. Terminology used in FIGS. 1 and 2 may be used in the example without further reference to FIGS. 1 and 2.

Example 1

Figure 3:
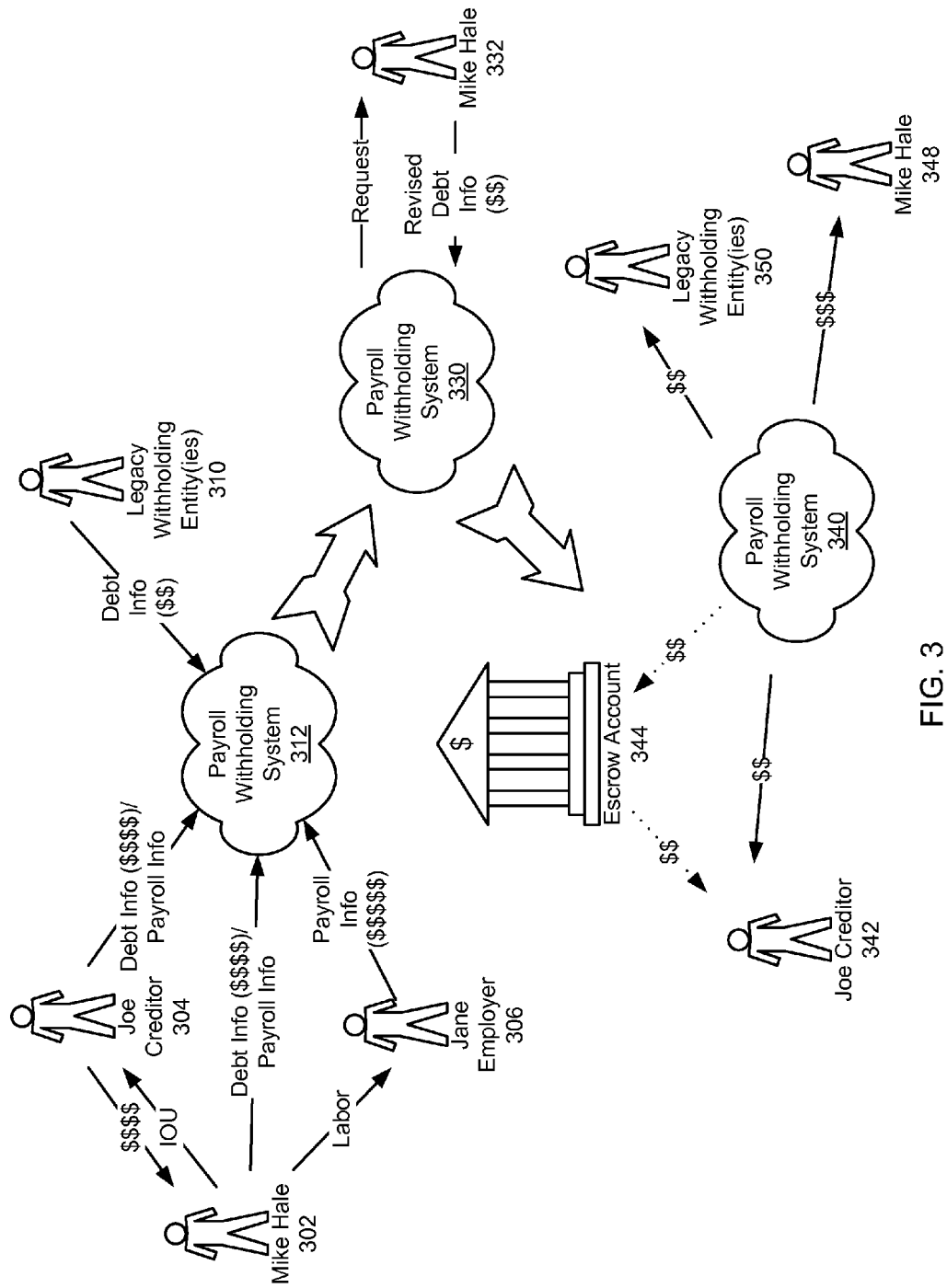
FIGS. 3 and 4 show an example of payroll withholding for debt management in accordance with one or more embodiments of the invention.

Consider the following example that describes payroll withholding for debt management in accordance with one or more embodiments described above. Specifically, Mike Hale (302), an employee of Jane Employer (306), owes money to Joe Creditor (304), as shown in the first portion of FIG. 3. Mike Hale (302) also has obligations associated with the legacy withholdings of the employee's wages to one or more Legacy Withholding Entities (310). Mike Hale (302) may be working for Jane Employer (306) as a full-time employee, a part-time employee, a consultant, a member of the board of directors, or in some other capacity to receive financial compensation from Jane Employer (306) for services rendered. Mike Hale (302) needs help paying off his debt to Joe Creditor (304), and so Mike Hale (302) utilizes the payroll withholding system (312). The payroll withholding system (312) may be the same payroll system used by Jane Employer (306). Jane Employer (306) and/or Mike Hale (302) may send payroll information regarding Mike Hale (302) to the payroll withholding system (312). Joe Creditor (304) and/or Mike Hale (302) may send debt information to the payroll withholding system (312). The Legacy Withholding Entities (310) may also send debt information to the payroll withholding system (312). Mike Hale (302) may choose to disclose all or a portion of his debt information to the payroll withholding system (312).

The payroll information and/or debt information may be obtained from a financial and/or payroll software package (e.g., Intuit® Online Payroll, Intuit® Quickbooks®) (Intuit and Quickbooks are registered trademarks of Intuit, Inc., of Mountain View, Calif.) used by Jane Employer (306), Joe Creditor (304), Mike Hale (302), and/or one or more of the Legacy Withholding Entities (310) on a computer system. The financial and/or payroll software package may then send the payroll and/or debt information to the payroll withholding system (312) using the application interface, as described above with respect to FIG. 1. Once the payroll withholding system (312) receives all of the payroll information and debt information for Mike Hale (302), the process proceeds to the next step.

In the second step of this Example 1, the payroll withholding system (330) determines the amount of available payroll funds and the debt amount for Mike Hale (332). The payroll withholding system (330) then determines that the amount of available payroll funds is not sufficient to pay the debt amount. There are a number of ways to try to resolve this issue. The employee may change one or more legacy withholdings that the employee is able to change (e.g., the number of tax exemptions declared, the amount contributed to a 401 (k) plan), which may effectively increase the amount of available payroll funds. The employee may elect to acquire interim funding, as described above with respect to FIG. 2. The employee may also revise the debt information. Revising the debt information may involve changing a preference or requirement with respect to one or more debts owed by the employee. For example, the employee may elect to reduce payment to a vendor to a minimum amount allowed by the vendor. As another example, the employee may remove a debt from the debt information provided to the payroll withholding system (330). In this example, Mike Hale (302), upon being notified that the available payroll funds are not enough to cover the debt amount, revises his debt information to effectively reduce the debt amount.

In the final step of this Example 1, the payroll withholding system (340), after receiving the revised debt information in the previous step, recalculates the debt amount (i.e., determines the revised debt amount) based on the revised debt information. As a result, the payroll withholding system (340) determines that the available payroll funds are sufficient to cover the revised debt amount. Upon determining that the available payroll funds are sufficient, the payroll withholding system (340) distributes the payroll of Mike Hale (348). Specifically, the payroll withholding system (340) sends some of the gross payroll amount of Mike Hale (348) to the Legacy Withholding Entities (350). The difference between the gross payroll amount and the amount sent to the Legacy Withholding Entities (350) is the amount of available payroll funds. A portion of the available payroll funds are sent Joe Creditor (342), according to the revised debt information received in the previous step. If the debt amount is due to Joe Creditor (342) on that day, then the debt amount is sent directly to Joe Creditor (342). If the debt amount is due to Joe Creditor (342) at some point in the future, then the debt amount is placed in an escrow account (344). When the day the debt amount is due to Joe Creditor (342) arrives, the debt amount is released from the escrow account (344) and sent to Joe Creditor (342). The balance of the available payroll funds is sent to Mike Hale (302). In one or more embodiments of the invention, the payroll withholding system (340) sends the balance of the available payroll funds to a direct deposit service (not shown), which sends the balance of the available payroll funds to a account held by Mike Hale (348) in a bank (not shown).

Example 2

Consider the following example that describes payroll withholding for debt management in accordance with one or more embodiments described above. Specifically, Mike Hale (402), an employee of Jane Employer (406), owes money to Joe Creditor (404), as shown in the first portion of FIG. 4. Mike Hale (402) also has obligations associated with the legacy withholdings of the employee's wages to one or more Legacy Withholding Entities (410). In the first step of this Example 2, the interaction between Mike Hale (402), Joe Creditor (404), Jane Employer (406), the Legacy Withholding Entities (410), and the payroll withholding system (412) are substantially similar to the interaction between Mike Hale (302), Joe Creditor (304), Jane Employer (306), the Legacy Withholding Entities (310), and the payroll withholding system (312) described above with respect to Example 1.

Figure 4:
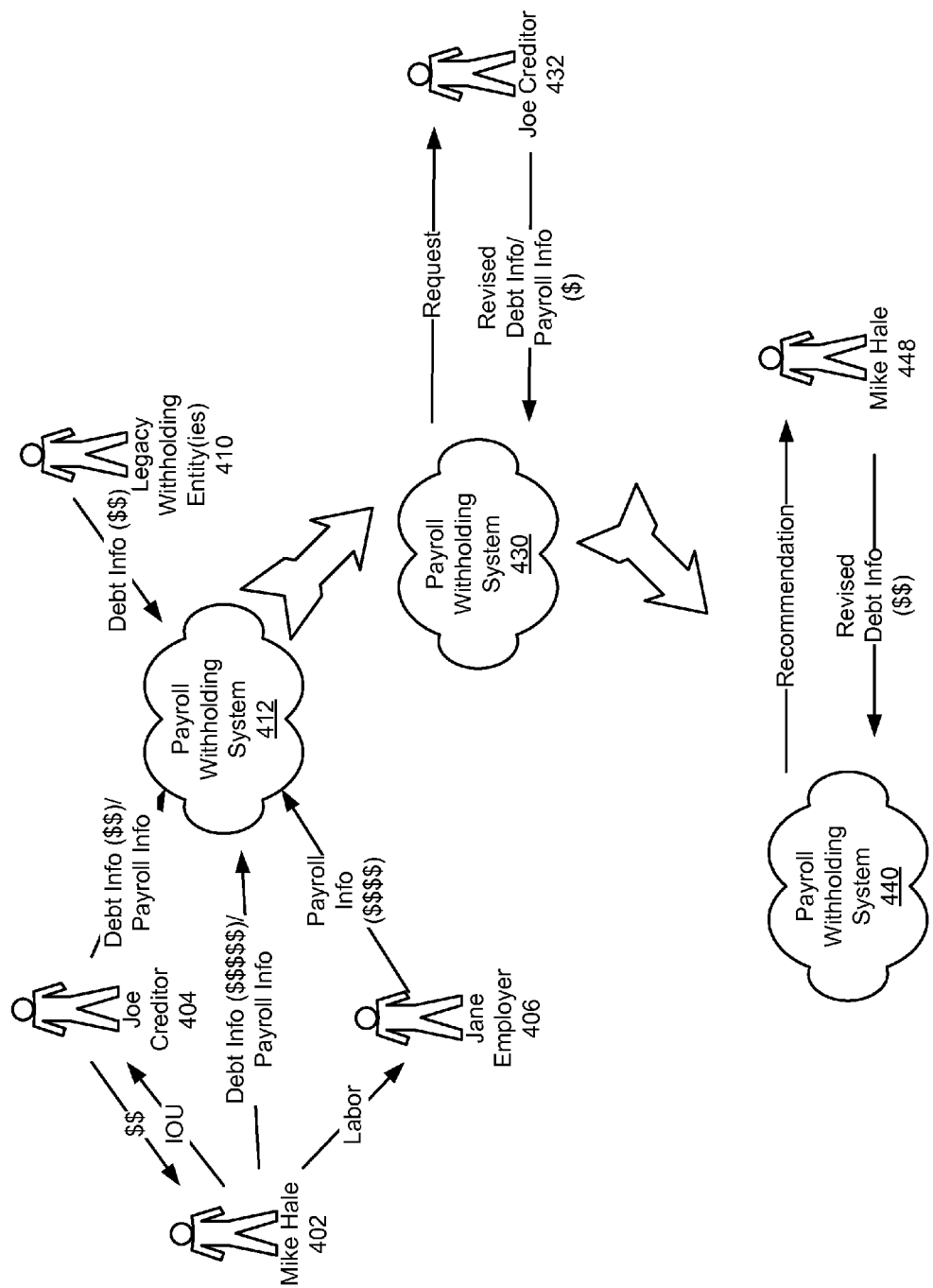

In the second step of this Example 2 shown in FIG. 4, the payroll withholding system (430) determines the amount of available payroll funds and the debt amount for Mike Hale (not shown). The payroll withholding system (430) then analyzes that the debt owed to Joe Creditor (432) and evaluates various options to make the debt to Joe Creditor (432) easier to manage and/or more attractive to Mike Hale. For example, the payroll withholding system (432) may identify that Joe Creditor (432) holds a mortgage on Mike Hale's house and that, because the value of Mike Hale's home has dropped over 50% from the time the mortgage was secured five years ago, and because the interest rate on the mortgage is over two points higher than the currently prevailing interest rates for a thirty year fixed mortgage, it is worth approaching Joe Creditor (432) with a request to restructure the mortgage terms. The payroll withholding system (430) formulates a request and sends the request to Joe Creditor (432). Joe Creditor (432) then determines whether to revise the debt owed to Joe Creditor (432) by Mike Hale based on the request received from the payroll withholding system (430). If Joe Creditor (432) agrees with the request, Joe Creditor (432) sends revised debt information to the payroll withholding system (430).

As another example, Joe Creditor (432) is identified by the payroll withholding system (430) as a provider of electric service to Mike Hale's home. Mike Hale lives in Houston, Tex., where the monthly bill he receives from Joe Creditor (432) during the summer months are over three times as high as the monthly bill he receives from Joe Creditor (432) during the winter months. Because of these seasonal differences, Mike Hale has difficulty paying his summer bills to Joe Creditor (432). As a result, the payroll withholding system (430) approaches Joe Creditor (432) to see if Joe Creditor (432) offers a balanced billing program and, if so, what the terms of that program are. A balanced billing program would allow Mike Hale to pay for an approximate average usage of electricity, on an annual basis, each month to Joe Creditor (432) rather than pay for actual usage each month, as Mike Hale currently does. As with the previous example for this second step of Example 2, the payroll withholding system (430) formulates a request and sends the request to Joe Creditor (432). Joe Creditor (432) then determines whether to revise the debt owed to Joe Creditor (432) by Mike Hale based on the request received from the payroll withholding system (430). If Joe Creditor (432) agrees with the request, Joe Creditor (432) sends revised debt information to the payroll withholding system (430).

Those skilled in the art will appreciate that scenarios such as those described above with respect to the second step of this Example 2, between the payroll withholding system (430) and Joe Creditor (432), may also apply between the payroll withholding system (430) and other entities, such as a legacy withholding entity (410) (for example, in restructuring an alimony payment) and Jane Employer (406) (for example, to restructure interim funds previously provided by Jane Employer (406) to Mike Hale (402)).

In the third step of this Example 2, the revised debt information received by the payroll withholding system (440) in the previous step, as described above, is a proposal from Joe Creditor (not shown). In response, the payroll withholding system (440) creates a recommendation to Mike Hale (448) based on the proposed revised debt information. The recommendation may be presented in a number of ways by the payroll withholding system (440), such as in text, in a table, in a graph, on a spreadsheet, or in some other way so as to communicate the benefits and disadvantages of the proposed debt structure relative to the existing debt structure. Mike Hale (448) may accept the proposed debt structure recommended by the payroll withholding system (440). Mike Hale (448) may also reject the proposed debt structure, or Mike Hale (448) may propose changes to the proposed debt structure. In the latter case, the payroll withholding system (440) would communicate the proposed changes to the proposed debt structure to Joe Creditor. This process could undergo several iterations before a resolution is reached.

A final step (not shown) of this Example 2, is substantially similar to the final step of Example 1. Specifically, the distribution of the payroll funds of Mike Hale by the payroll withholding system to the Legacy Withholding Entities, Joe Creditor, and Mike Hale is substantially similar to the distribution described above with respect to Example 1.

One or more embodiments of the invention provide the capability of helping an employee employed by an employer and receiving funds through a payroll service to reduce the amount of debt incurred by the employee. One or more embodiments of the invention provide for employee-authorized withholding of payroll funds, while the funds are controlled by the payroll service, to pay one or more creditors of the employee. In such a case, the employee may avoid the dilemma of receiving his payroll (after legacy withholdings are removed) and risk spending the payroll on discretionary items rather than pay down a debt owed to a creditor.

Embodiments of the invention may provide the employee with actual control over money (rather than simply a budgeting or planning tool) to manage debt obligations. Further, embodiments of the invention may control the employee's paycheck before funds reach the employee's bank account. Such embodiments of the invention may prevent the employee from incurring further debt when the employee tends to spend money in his bank account because the money does not appear in the employee's bank account.

Embodiments of the invention may be used to manage ongoing payments against accrued debt to ensure that the ongoing payments are made successfully. For example, employees classified as the "working poor" may often pay late fees or fees for bounced checks that further the cycle of poverty. Such employees may tend to live paycheck to paycheck. As such, making debt payments may be difficult because the frequency at which a paycheck is received, the inconsistency in the amount of each paycheck (as with hourly workers whose weekly schedules vary, perhaps from sporadic overtime and/or shortages of work), and the varying due dates for each debt payment throughout a month do not coincide. In other words, an employee may have difficulty in setting aside a portion of a current paycheck to help make a debt payment that is due after a subsequent paycheck is received, where the subsequent paycheck, by itself, is not enough to cover the amount due for the debt. For example, an hourly employee who is paid weekly with various paycheck amounts may have difficulty making a monthly mortgage payment, which is greater than any single weekly paycheck that the employee receives. Embodiments of the invention may help employees save an amount across multiple paychecks to make a required debt payment.

Embodiments of the invention may consider actual or projected annual income as the basis for creating recommendations and plans for managing debt obligations. Embodiments of the invention may also consider averaged savings for bill payment, savings goals, and other factors in creating recommendations and/or plans for the employee. Embodiments of the invention may also be used to provide a source of funding to meet daily necessities of the employee in times of income shortage.

Embodiments of the invention may also be used when more than one employee is the debtor and/or when more than one employee contribute to make a debt payment(s). In such cases, multiple paychecks (sometimes from multiple sources) are involved with multiple pay frequencies that probably do not coincide. Similarly, there may be only one employee who works two jobs, thereby creating a situation with increased complexity in tax consequences (e.g., withholding limits generally only being considered for each job individually, not as a whole).

Embodiments of the invention may also be used to create reserve funds to make up for times where available payroll funds are less than a debt amount for a given pay period or other period of time.

In one or more embodiments of the invention, the payroll withholding system analyzes withholding information that is specific to the employee and makes recommendations that are specific to the employee to assist the employee in reducing debt owed by an employee to one or more creditors. In one or more embodiments of the invention, the employee retains ultimate control over various aspects of the payroll withholding system, including but not limited to the non-legacy withholdings, which creditors are considered by the payroll withholding system, and the amount of payments made to each creditor.

Figure 5:
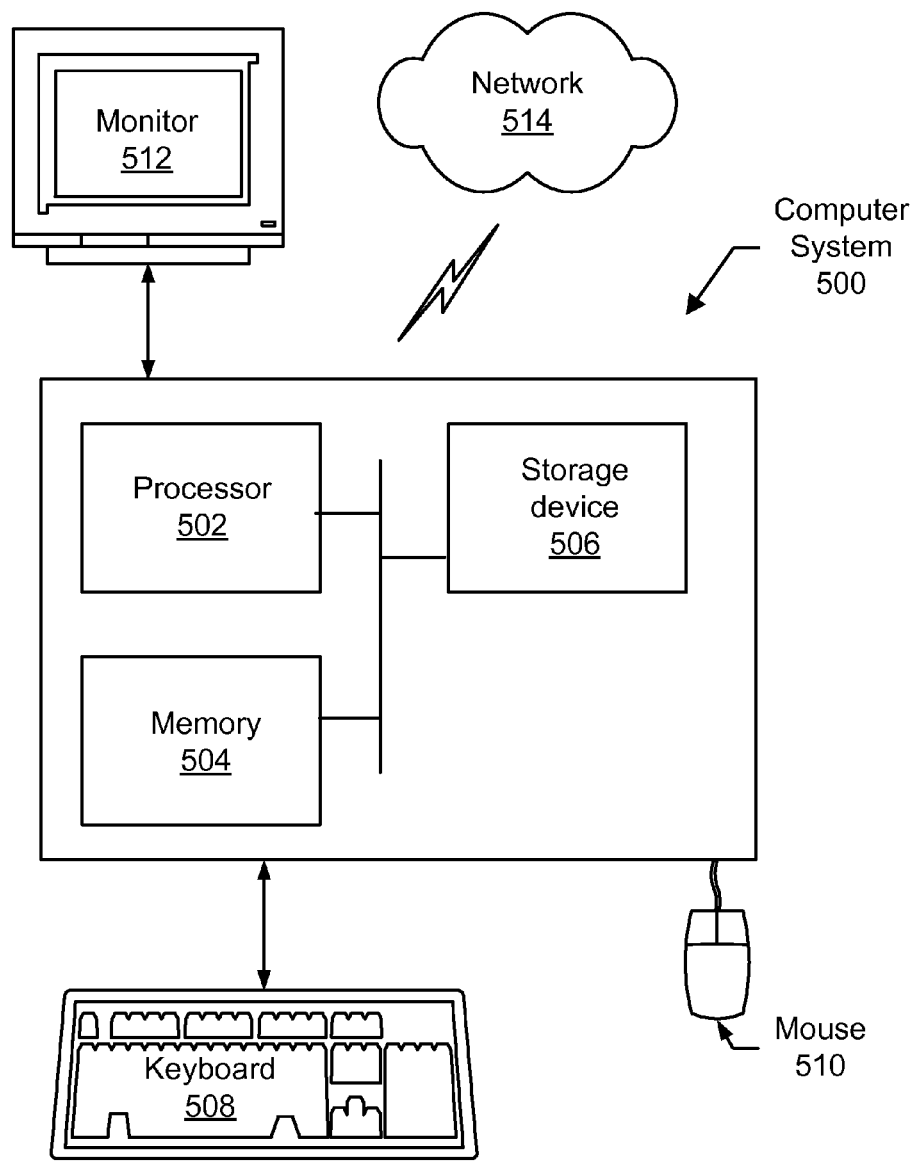
FIG. 5 shows a computer system in accordance with one or more embodiments of the invention.

Embodiments of the invention may be implemented on virtually any type of computer regardless of the platform being used. For example, as shown in FIG. 5, a computer system (500) includes one or more processor(s) (502), associated memory (504) (e.g., random access memory (RAM), cache memory, flash memory, etc.), a storage device (506) (e.g., a hard disk, an optical drive such as a compact disk drive or digital video disk (DVD) drive, a flash memory stick, etc.), and numerous other elements and functionalities typical of today's computers (not shown). The computer (500) may also include input means, such as a keyboard (508), a mouse (510), or a microphone (not shown). Further, the computer (500) may include output means, such as a monitor (512) (e.g., a liquid crystal display (LCD), a plasma display, or cathode ray tube (CRT) monitor). The computer system (500) may be connected to a network (514) (e.g., a local area network (LAN), a wide area network (WAN) such as the Internet, or any other similar type of network) via a network interface connection (not shown). Those skilled in the art will appreciate that many different types of computer systems exist, and the aforementioned input and output means may take other forms, now known or later developed. Generally speaking, the computer system (500) includes at least the minimal processing, input, and/or output means necessary to practice embodiments of the invention.

Further, those skilled in the art will appreciate that one or more elements of the aforementioned computer system (500) may be located at a remote location and connected to the other elements over a network. Further, embodiments of the invention may be implemented on a distributed system having a plurality of nodes, where each portion of the invention (e.g., data compression module, data decompression module) may be located on a different node within the distributed system. In one or more embodiments of the invention, the node corresponds to a computer system. Alternatively, the node may correspond to a processor with associated physical memory. The node may alternatively correspond to a processor with shared memory and/or resources. Further, software instructions to perform embodiments of the invention may be stored on a computer readable medium such as a compact disc (CD), a diskette, a tape, or any other physical computer readable storage device.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for withholding an amount of payroll funds of an employee to fulfill a financial obligation of the employee, the method comprising:
    receiving, from a credit card company, employee debt information;
    receiving, from an employer of the employee, employee payroll information;
    calculating, using a central processing unit (CPU), an amount of available payroll funds based on the employee payroll information, wherein the amount of available payroll funds is an amount of gross payroll funds less an amount of a legacy withholding;
    determining, using the CPU, whether the amount of available payroll funds exceeds a credit card debt amount owed by the employee to the credit card company, wherein the credit card debt amount is based on the employee debt information;
    deducting, using the CPU, the credit card debt amount from the amount of available payroll funds to obtain a payroll balance;
    transferring, using the CPU, the credit card debt amount to the credit card company-to fulfill the financial obligation before transferring the payroll balance to the employee;
    transferring the payroll balance to a direct deposit service, wherein the direct deposit service transfers the payroll balance to a bank account of the employee;
    verifying, based on running payroll and using the CPU, that the amount of payroll funds is greater than a debt amount;
    receiving revised employee debt information after running payroll; and
    calculating a revised debt amount based on the revised employee debt information.

2. The method of claim 1, further comprising:
    determining that a date that payroll is run is prior to a date that payment is due to a creditor; and
    transferring the debt amount to an account for release on a date that the payment is due to the creditor.

3. The method of claim 2, wherein the account is an escrow account and wherein an escrow agent releases the debt amount to the creditor on the date that the payment is due to the creditor.

4. The method of claim 2, further comprising:
    sending an interest payment to the employee, wherein the interest payment comprises interest earned while the debt amount is in the account.

5. The method of claim 1, wherein the payroll balance is the amount of available payroll funds less the credit card debt amount.

6. The method of claim 1, wherein the legacy withholding is at least one of a group consisting of a federal tax, a state tax, a local tax, insurance, a retirement plan, a stock purchase plan, a medical reimbursement plan, union dues, a wage garnishment, and an expense directly related to a job function, as allowed by a government entity, of the employee in a course of employment for the employer.

7. The method of claim 1, wherein the employee includes household members of the employee.

8. The method of claim 1, wherein the employee debt information comprises a parameter set by the employee.

9. The method of claim 1, further comprising:
    sending a confirmation to the employee that the credit card company received the credit card debt amount.

10. The method of claim 1, further comprising:
    determining, after calculating the amount of available payroll funds, that the amount of available payroll funds is less than the credit card debt amount; and
    determining that interim funds are available.

11. The method of claim 10, further comprising:
    sending terms for the interim funds to the employee;
    receiving acceptance of the terms for the interim funds from the employee; and
    sending the interim funds for the credit card debt amount to the credit card company to fulfill the financial obligation.

12. The method of claim 10, wherein the interim funds are reserve funds collected in a prior pay period from an amount of available payroll funds in excess of the credit card debt amount and placed in a reserve account.

13. The method of claim 1, further comprising:
    collecting data comprising the employee payroll information, the legacy withholding, and the employee debt information; and
    providing specific financial advice to the employee based on the data.

14. The method of claim 1, wherein the gross payroll funds comprise a special payroll item comprising at least one of a group consisting of a bonus payment and an expense reimbursement.

15. The method of claim 1, wherein the employee is non-salaried.

16. The method of claim 1, wherein the credit card debt amount is a minimum amount owed by the employee to the credit card company.

17. The method of claim 1, wherein the employee payroll information and the legacy withholding is received from a payroll system.

18. The method of claim 1, wherein the available payroll funds are an estimate based on an average of payroll data for the employee.

19. A non-transitory computer readable storage medium storing instructions for withholding an amount of payroll funds of an employee to fulfill a financial obligation of the employee, the instructions executable on a processor and comprising functionality to:
    receive, from a credit card company, employee debt information;
    receive, from an employer of the employee, employee payroll information;
    calculate an amount of available payroll funds based on the employee payroll information, wherein the amount of available payroll funds is an amount of gross payroll funds less an amount of a legacy withholding;
    determine whether the amount of available payroll funds exceeds a credit card debt amount owed by the employee to the credit card company, wherein the credit card debt amount is based on the employee debt information;
    deduct the credit card debt amount from the amount of available payroll funds to obtain a payroll balance transfer the credit card debt amount to the credit card company to fulfill the financial obligation before transferring the payroll balance to the employee;

transfer the payroll balance to a direct deposit service, wherein the direct deposit service transfers the payroll balance to a bank account of the employee;

verify, based on running payroll, that the amount of payroll funds is greater than a debt amount;

receive revised employee debt information after running payroll; and calculate a revised debt amount based on the revised employee debt information.

20. The non-transitory computer readable storage medium of claim 19, further comprising functionality to:

determine that a date that payroll is run is prior to a date that payment is due to a creditor; and transfer the debt amount to an account for release on a date that the payment is due to the creditor.

21. The non-transitory computer readable storage medium of claim 20, further comprising functionality to:

send an interest payment to the employee, wherein the interest payment comprises interest earned while the debt amount is in the account.

22. The non-transitory computer readable storage medium of claim 19, further comprising functionality to:

determine, after calculating the amount of available payroll funds, that the amount of available payroll funds is less than the credit card debt amount; and determine that interim funds are available.

23. The non-transitory computer readable storage medium of claim 22, further comprising functionality to:

send terms for the interim funds to the employee;

receive acceptance of the terms for the interim funds from the employee; and send the interim funds for the credit card debt amount to the credit card company to fulfill the financial obligation.

24. The non-transitory computer readable storage medium of claim 19, further comprising functionality to:

collect data comprising the employee payroll information, the legacy withholding, and the employee debt information; and provide specific financial advice to the employee based on the data.

25. A system for withholding an amount of payroll funds of an employee to fulfill a financial obligation of the employee, the system comprising:

a payroll calculator executing on a central processing unit (CPU) and configured to calculate an amount of available payroll funds based on employee payroll information, wherein the amount of available payroll funds is an amount of gross payroll funds less an amount of a legacy withholding;

a payment calculator executing on the CPU and configured to calculate a credit card debt amount based on employee debt information;

a payroll funds coordinator executing on the CPU and configured to:

receive, from a credit card company, the employee debt information;

send the employee debt information to the payment calculator;

receive, from an employer of the employee, the employee payroll information;

send the employee payroll information to the payroll calculator;

receive the amount of available payroll funds from the payroll calculator;

receive the credit card debt amount from the payment calculator;

determine whether the amount of available payroll funds is greater than the credit card debt amount owed by the employee to the credit card company;

deduct the credit card debt amount from the amount of available payroll funds to obtain a payroll balance; and transfer the credit card debt amount to the credit card company to fulfill the financial obligation before transferring the payroll balance to the employee;

transfer the payroll balance to a direct deposit service, wherein the direct deposit service transfers the payroll balance to a bank account of the employee;

verify, based on running payroll, that the amount of payroll funds is greater than a debt amount;

receive revised employee debt information after running payroll; and calculate a revised debt amount based on the revised employee debt information.

26. The system of claim 25, further comprising:

a financial advice engine executing on the CPU and configured to:

collect data comprising the employee payroll information, the legacy withholding, and the employee debt information; and provide specific financial advice to the employee based on the data.

27. The system of claim 25, wherein the payroll funds coordinator is further configured to send a confirmation to the employee that the credit card company received the credit card debt amount.

28. The system of claim 25, wherein the payroll funds coordinator is further configured to transfer the debt amount to an escrow account prior to sending a debt amount to a creditor on a due date.

29. The system of claim 25, wherein the payroll funds coordinator is further configured to transfer the payroll balance to an account on behalf of the employee.

30. The system of claim 25, wherein the financial advice engine is further configured to:

determine whether interim funds are available when the amount of available payroll funds is less than the credit card debt amount.

31. The system of claim 30, wherein the payroll funds coordinator is further configured to:

send terms for the interim funds to the employee;

receive acceptance of the terms for the interim funds from the employee; and send the interim funds for the credit card debt amount to the credit card company to fulfill the financial obligation.

32. The system of claim 25, further comprising:

a storage repository executing on the CPU and configured to store withholding information comprising the employee payroll information and the employee debt information.

33. The system of claim 25, wherein the employee payroll information and the legacy withholding is received from a third-party payroll service.

34. The system of claim 25, wherein the financial advice engine is further configured to:

create a goal for the employee, wherein the goal is related to one of a group consisting of debt reduction, retirement, and savings;

suspend the goal for the employee after a first length of time; and reinstate the goal for the employee after a second length of time,
wherein the first length of time precedes the second length of time, and
wherein the goal is reinstated when a condition causing the goal to be suspended ceases to exist.

* * * * *